July 1, 1958 T. J. DUNN ET AL 2,840,974
POWER MOWER ASSEMBLY WORK POSITION HOLDING MEANS
Filed March 29, 1957 3 Sheets-Sheet 3
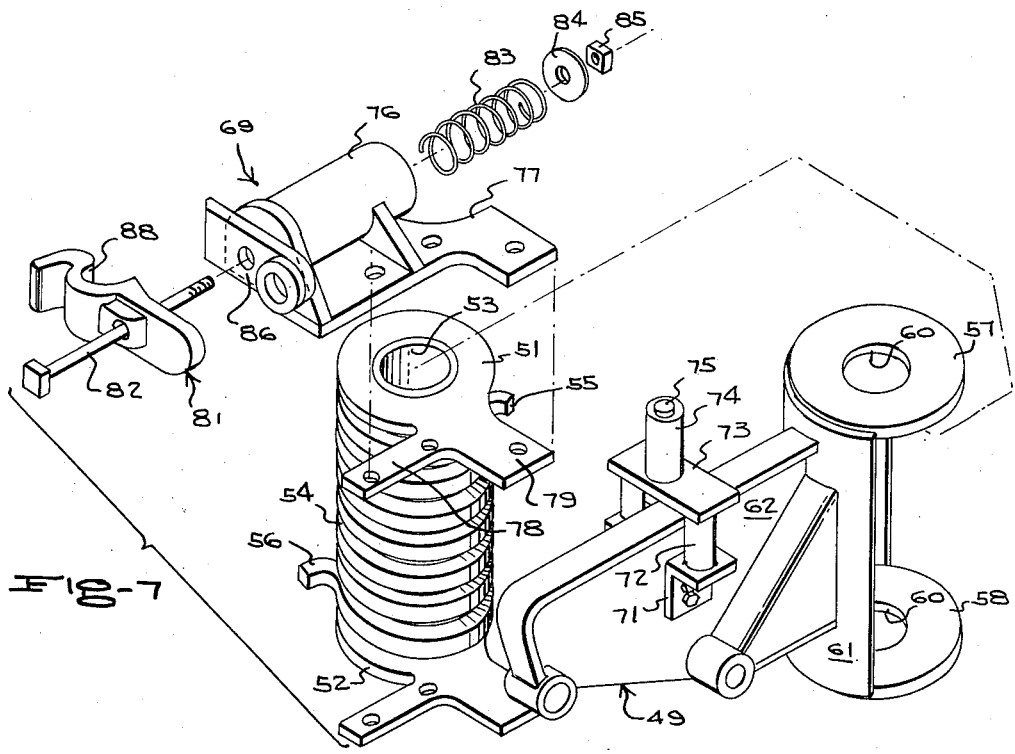
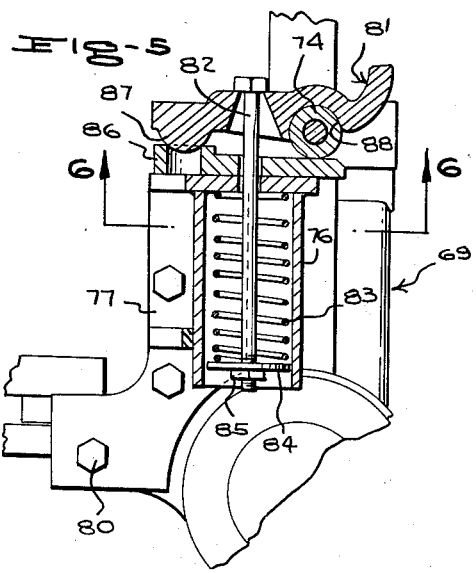
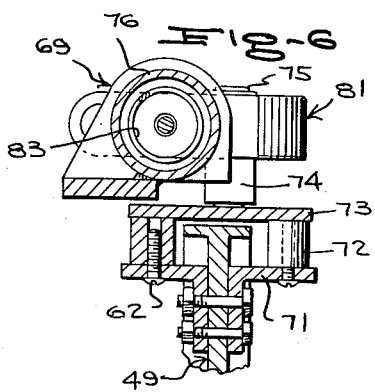
INVENTORS
THOMAS J. DUNN &
HERBERT W. DAVIS
BY
McMorrow, Berman & Davidson
ATTORNEYS

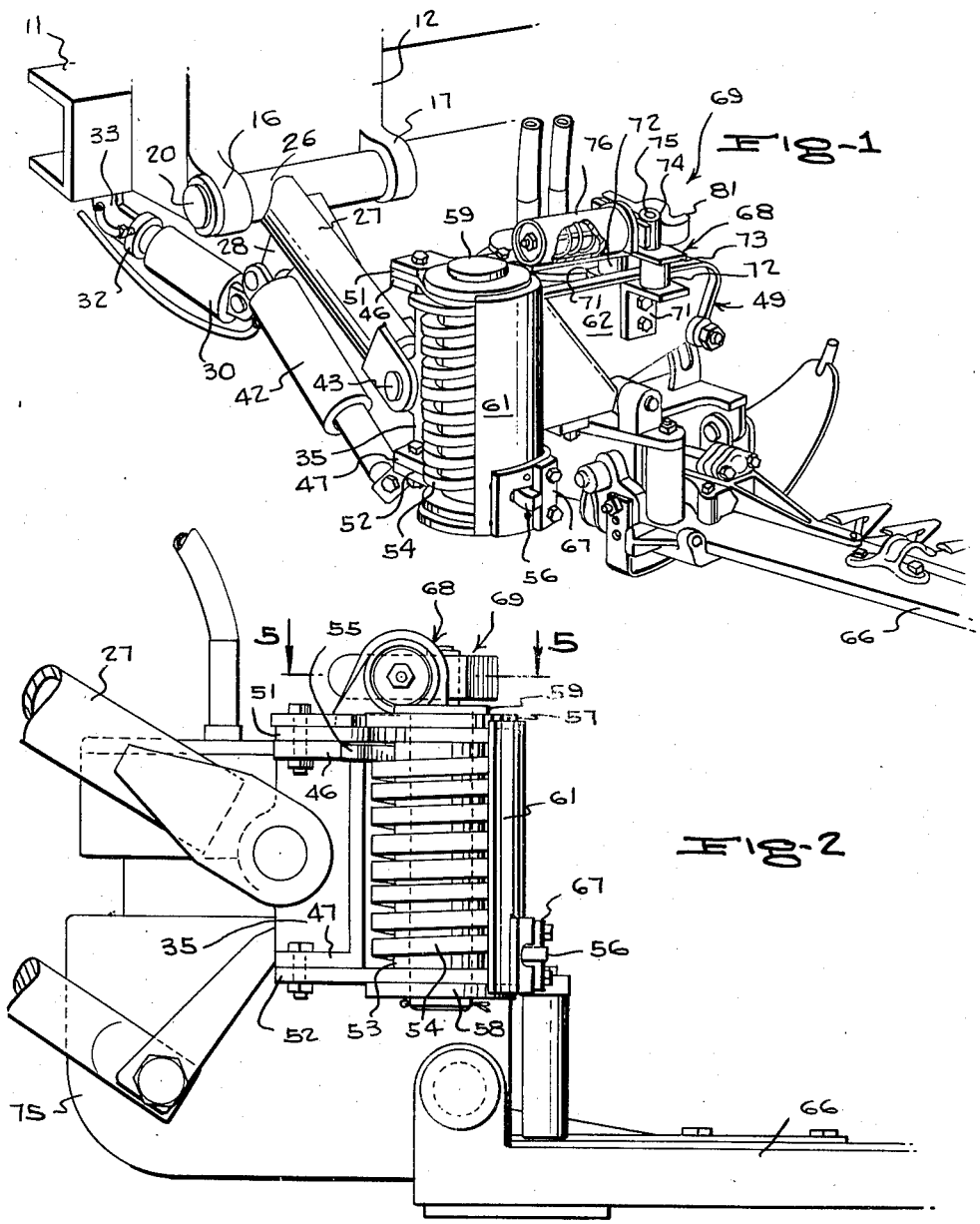

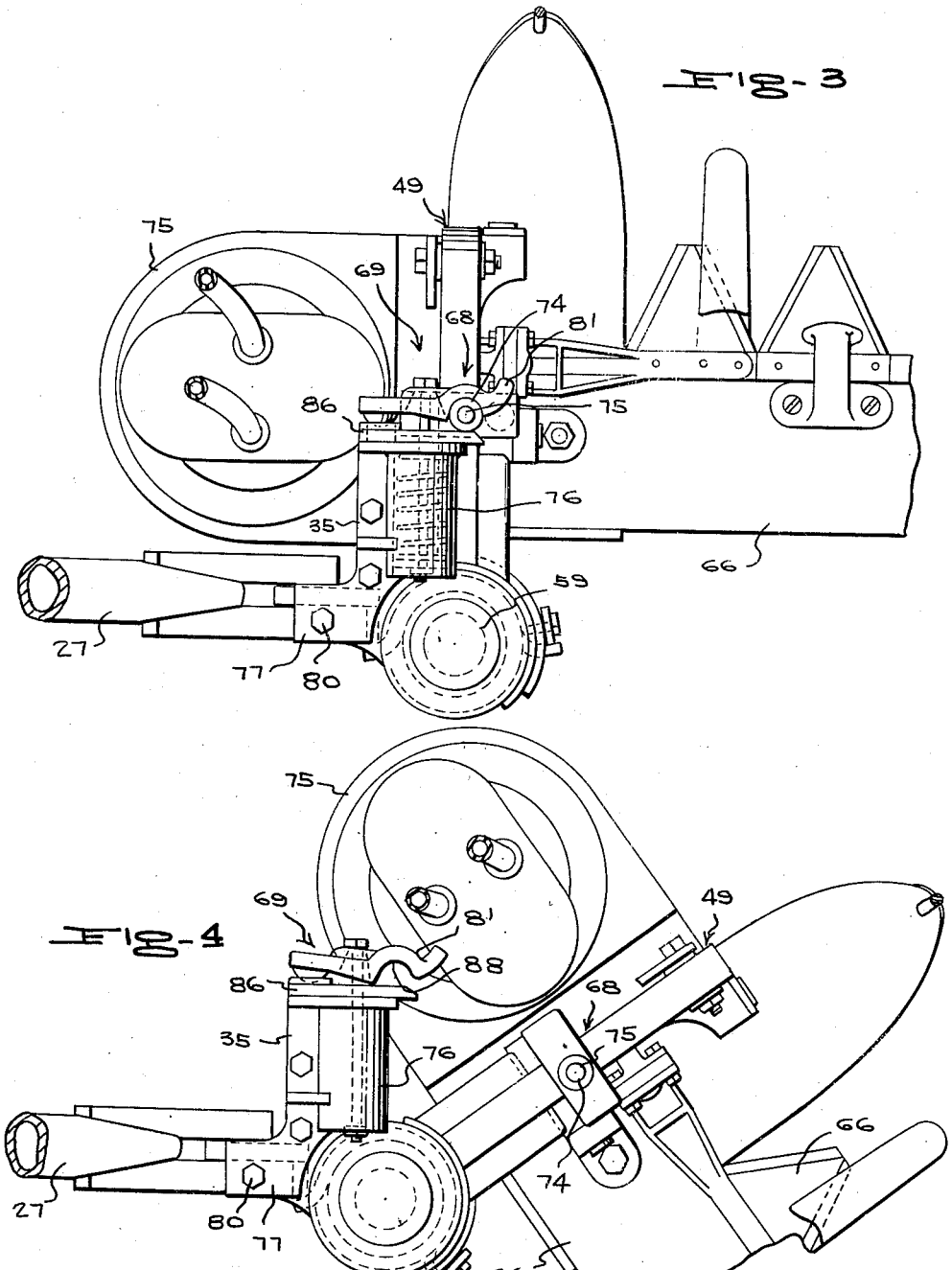

United States Patent Office 2,840,974
Patented July 1, 1958

2,840,974

POWER MOWER ASSEMBLY WORK POSITION HOLDING MEANS

Thomas J. Dunn and Herbert W. Davis, Hackettstown, N. J., assignors to Certified Equipment Corporation, New York, N. Y., a corporation of New York Application March 29, 1957, Serial No. 649,385

3 Claims. (Cl. 56—25)

This invention relates to a power mower attachment, and more particularly to a power mower assembly work position holding means.

In our prior patent, No. 2,729,044, there is disclosed and claimed a power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first-named axis in upwardly and downwardly directions, an upstanding bracket arranged at a right angle with respect to said upstanding frame and connected to said frame for rotational movement upon a vertically disposed pin in clockwise and counterclockwise directions, a horizontally disposed reciprocatory knife mower assembly arranged on the forward side of said arm and extending transversely of said bracket and carried by said bracket for movement with the latter, and a coil spring operatively connected to said pin for biasing said bracket toward the counterclockwise direction.

In the drawings:

Figure 1 is a fragmentary perspective view of a power mower assembly shown attached to a side of a tractor frame and with parts broken away and shown in section;

Figure 2 is a fragmentary elevational view with parts broken away and shown in section of the structure shown in Figure 1;

Figure 3 is a top view of the structures shown in Figures 1 and 2, showing the normal interengagement position of the abutment with the latching lever holding the mower assembly in the transverse position;

Figure 4 is a top view similar to Figure 3, showing the disengaged position of the abutment from the latching lever in response to force applied to the mower assembly;

Figure 5 is a sectional view taken on the line 5—5 of Figure 2;

Figure 6 is a sectional view taken on the line 6—6 of Figure 5; and

Figure 7 is a perspective exploded view of the components which permit the swinging movement of the mower assembly, together with the components of the present invention.

Referring in greater detail to the drawings in which like numerals indicate like parts throughout the several views, the present invention consists in an attachment for a power mower assembly and the reference numeral 11 designates the side of a frame of a tractor. An upstanding housing 12 has one of its sides adapted for attachment in side by side relation with respect to the side 11 of the tractor and a pair of lugs 16 and 17 are arranged in horizontal spaced relation and project outwardly from the side of the housing 12 remote from the side which is adapted for attachment to the tractor frame side 11. The lugs 16 and 17 support between them a horizontally disposed shaft 20 about which is circumposed a sleeve 26. An arm 27 is arranged on the side of the housing 12 adjacent the lugs 16 and 17 and slopes downwardly and outwardly from the lower end of the housing and has its upper end fixedly secured to the sleeve 26 for swinging movement about a horizontal axis in upwardly and downwardly directions.

A downwardly depending arm 28 has its upper end secured to the upper end of the arm 27 and to the sleeve 26. The lower end of the arm 28 is pivotally connected to the casing 30 of a hydraulic cylinder assembly having its actuating arm 32 pivotally connected to the downwardly depending lug 33 secured to the tractor frame side 11.

An upstanding frame 35 is positioned adjacent the lower end of the arm 27 and is connected intermediate its end to the lower end of the arm 27 for swinging movement about a second horizontal axis or pin 43 parallel to and spaced from the shaft 20 which is the first axis.

Upon admission of fluid under pressure into the hydraulic cylinder assembly embodied by the casing 30 and the actuating arm 32 the frame 35 is caused to move upwardly and upon release of such fluid the frame 35 will move downwardly.

Another hydraulic cylinder assembly 42 extends between the lower end of the frame 35 and the arm 28 adjacent the point of the connection of the casing 30 to the arm 28 and serves, when fluid is admitted thereto, to effect the rotation of the frame 35 about its point of connection with the lower end of the arm 27, there being provided the pin 43 extending between the bifurcated lower end of the arm 27 and the adjacent part of the frame 35.

An upstanding bracket 49 is arranged at right angles with respect to the upstanding frame 35 and is connected to the frame 35 for rotational movement about a vertical axis embodying a vertically disposed pin 59 in clockwise and counterclockwise directions.

Referring to Figure 2, the frame 35 has horizontally disposed based upper and lower flanges 46 and 47, respectively. Exteriorly of the flanges 46 and 47 are positioned horizontally disposed plates 51 and 52 (Fig. 6) which are secured to a vertically disposed sleeve 53. Circumposed about the sleeve 53 is a coil spring 54 having its upper and lower ends outwardly bent to form hooks 55 and 56, respectively.

The bracket 49 includes horizontally disposed spaced upper and lower members 57 and 58 which are positioned exteriorly of and abut the plates 51 and 52, respectively, and are each provided with a centrally located aperture 60 through which extends the pin 59 for support of the bracket 49 for swinging movement in clockwise and counterclockwise directions about the pin 59 as an axis.

A vertically disposed semicylindrical member 61 extends between the members 57 and 58 and forms the means for connecting them to the bight 62 of the bracket 49. A horizontally disposed reciprocating knife mower assembly is arranged on the forward side of the arm 27 and extends transversely of the bracket 49 and is carried by the bracket 49 for movement in clockwise and counterclockwise directions with the bracket 49. The knife mower assembly is indicated by the reference numeral 66.

The hook 56 on the lower end of the coil spring 54 projects through a hole provided in the member 61 and bears against an adjustable abutment member 67. The other hook 55 of the spring 54 engages the adjacent portion of the flange 46 of the frame 35. The spring 54 biases the bracket 49 toward the counter-clockwise direction.

The mower assembly 66 is normally in a transverse position relative to the tractor frame side 11 and means is provided by the present invention for releasably retaining the mower assembly 66 in a transverse position. This means is releasable from engagement with a cooperating holding element operatively connected to the frame 35 upon application of a retarding force applied to the mower assembly 66 upon forward travel of the mower assembly 66.

Specifically, this means comprises an upstanding abutment, designated generally by the reference numeral 68, carried by the bracket 49 and normally in interengagement with a spring biased latching lever 69 on the frame 35.

The abutment 68 includes a pair of L-shaped brackets 71, secured one each to each side of the bight 62 of the bracket 49, forming supports for a pair of cylindrical members 72 across the upper ends of which extend the horizontally disposed bar 73.

An upright roller 74 mounted upon an upstanding pin 75 is secured to the midportion of the bar 73.

The spring-biased latching lever 69 includes a horizontally disposed cylinder 76 mounted upon a substantially L-shaped plate 77 and having one end open. The plate 77 is secured to the arms 78 and 79 which project from one side of the plate 51, there being registering holes provided in the plate 77 and the arms 78 and 79 for the receipt therethrough of attaching bolts 80. A lever 81 is positioned adjacent the closed end of the cylinder 76 and is connected to the cylinder 76 for movement toward and away from the cylinder 76 by means of a bolt 82 which extends loosely through the lever 81 and into the cylinder 76. A coil spring 83 is circumposed about the intermediate portion of the bolt 82 and is secured to the bolt 82 by means of a washer 84 and a nut 85 threadedly engaged upon the threaded end portion of the bolt 82. The head of the bolt 82 is exteriorly of the lever 81. The spring 83 biases the head of the bolt 82 and therefore the lever 81 toward the closed end of the cylinder 76. A plate 86 is secured to the exterior face of the closed end of the cylinder 76 and is provided with a recess receiving a semi-hemispherical formation 87 formed on the end of the lever 81 remote from the curved end portion 88 which forms an entrance for the roller 74 for releasably lowering the roller 74 between the lever 81 and the other end of the plate 86.

In operation, upon forward movement of the tractor and the mower assembly 66, the interengagement of the roller 74 between the plate 86 and the lever 81 will secure the mower assembly 66 in a transverse position but will release the mower assembly 66 when an upstanding obstruction such as a tree trunk or other relatively immovable object is encountered and struck by the mower assembly 66.

It is intended that the engagement of the roller 74 between the lever 81 and the plate 86 is sufficiently resistant to disengagement that the mower assembly 66 may be used to cut grass and relatively heavy brush without forcing the movement of the assembly 66 from the transverse position. After clearing the obstruction, the mower assembly 66 will return to its transverse position under the action of the coil spring 54 and the abutment 68 will again be engaged by the latching lever 69.

What is claimed is:

1. In a power mower attachment including an upstanding housing adapted to be secured in side by side relation with respect to a side of a tractor frame, an arm arranged on the side of said housing remote from the side adapted to be secured to the tractor frame side adjacent the lower end of said housing, and sloping downwardly and outwardly from the lower end of said housing and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first-named axis in upwardly and downwardly directions, an upstanding bracket arranged at a right angle with respect to said upstanding frame and connected to said frame for rotational movement about a vertically disposed pin carried by said bracket in clockwise and counterclockwise directions, a horizontally disposed reciprocatory knife mower assembly arranged on the forward side of said arm and extending transversely of said bracket and carried by said bracket for movement with the latter, a coil spring operatively connected to said pin for biasing said bracket toward the counterclockwise direction, the improvement consisting in a releasable cooperating means on said upstanding frame and bracket for retaining said mower assembly in its transverse position.

2. In a power mower attachment including an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from the lower end of said housing and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first-named axis in upwardly and downwardly directions, an upstanding bracket arranged at a right angle with respect to said upstanding frame and connected to said frame for rotational movement about a vertically disposed pin carried by said bracket in clockwise and counterclockwise directions, a horizontally disposed reciprocatory knife mower assembly arranged on the forward side of said arm and extending transversely of said bracket and carried by said bracket for movement with the latter, a coil spring operatively connected to said pin for biasing said bracket toward the counterclockwise direction, the improvement consisting in a holding element on said bracket and normally in interengagement with a cooperating element on said upstanding frame for retaining said mower assembly in its transverse position and releasable from engagement with the cooperating element on said frame upon application of a retarding force applied to said mower assembly upon forward travel of said mower assembly.

3. In a power mower attachment including an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from the lower end of said housing and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first-named axis in upwardly and downwardly directions, an upstanding bracket arranged at a right angle with respect to said upstanding frame and connected to said frame for rotational movement about a vertically disposed pin carried by said bracket in clockwise and counterclockwise directions, a horizontally disposed reciprocatory knife mower assembly arranged on the forward side of said arm and extending transversely of said bracket and carried by said bracket for movement with the latter, a coil spring operatively connected to said pin for biasing said bracket toward the counterclockwise direction, the improvement consisting in an upstanding abutment on said bracket and normally in interengagement with a spring-biased latching lever on said upstanding frame for retaining said mower assembly in its transverse position and releasable from engagement from said lever upon application of retarding force applied to said mower assembly upon forward travel of said mower assembly.

References Cited in the file of this patent

UNITED STATES PATENTS

| | | |
|---|---|---|
| 2,291,987 | Rogers | Aug. 4, 1942 |
| 2,292,362 | Coultas | Aug. 11, 1942 |
| 2,663,133 | Davis | Dec. 22, 1953 |
| 2,729,044 | Dunn et al. | Jan. 3, 1956 |